(12) United States Patent
Tkachenko et al.

(10) Patent No.: US 8,890,684 B2
(45) Date of Patent: Nov. 18, 2014

(54) BACKGROUND OBJECT SENSOR

(75) Inventors: Artem Tkachenko, San Francisco, CA (US); Petya Vachranukuniet, Warrington, PA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 273 days.

(21) Appl. No.: 13/162,746

(22) Filed: Jun. 17, 2011

(65) Prior Publication Data

US 2012/0319819 A1 Dec. 20, 2012

(51) Int. Cl.
| | |
|---|---|
| *G01S 13/87* | (2006.01) |
| *G06K 7/10* | (2006.01) |
| *G06Q 10/08* | (2012.01) |
| *G01S 5/14* | (2006.01) |
| *G01S 13/56* | (2006.01) |
| *G01S 13/58* | (2006.01) |
| *G01S 11/10* | (2006.01) |
| *G01S 13/92* | (2006.01) |
| *G08B 13/24* | (2006.01) |

(52) U.S. Cl.
CPC ........... *G06K 7/10425* (2013.01); *G01S 13/878* (2013.01); *G01S 13/876* (2013.01); *G06Q 10/08* (2013.01); *G01S 5/14* (2013.01); *G01S 13/56* (2013.01); *G01S 13/58* (2013.01); *G01S 11/10* (2013.01); *G01S 13/92* (2013.01); *G08B 13/248* (2013.01)
USPC ............ 340/539.13; 340/539.11; 340/539.21; 340/572.1; 342/42; 342/51; 342/109; 342/118; 342/450

(58) Field of Classification Search
CPC ........... G01S 5/14; G01S 11/10; G01S 13/56; G01S 13/58; G01S 13/92; G01S 13/878; G01S 13/876; G06Q 10/08
USPC .................. 340/10.1, 572.13, 539.21, 572.1, 340/825.49, 10.4; 342/109, 118, 127
See application file for complete search history.

(56) References Cited

U.S. PATENT DOCUMENTS

| | | | |
|---|---|---|---|
| 5,030,941 A | | 7/1991 | Lizzi et al. |
| 6,046,683 A | * | 4/2000 | Pidwerbetsky et al. ....... 340/10.4 |
| 6,535,159 B1 | * | 3/2003 | Nishiguchi et al. ............. 342/27 |
| 7,023,341 B2 | | 4/2006 | Stilp |
| 7,626,488 B2 | * | 12/2009 | Armstrong et al. .......... 340/10.2 |
| 7,714,773 B2 | * | 5/2010 | Ozaki et al. ................... 342/118 |
| 8,228,171 B2 | * | 7/2012 | Bauchot et al. .............. 340/10.1 |
| 8,279,112 B2 | * | 10/2012 | Carrick .......................... 342/127 |
| 2004/0212493 A1 | | 10/2004 | Stilp |
| 2007/0001851 A1 | | 1/2007 | Reynolds et al. |
| 2008/0001735 A1 | | 1/2008 | Tran |

(Continued)

*Primary Examiner* — Daniel Wu
*Assistant Examiner* — Benyam Haile
(74) *Attorney, Agent, or Firm* — Richard A. Howe, II

(57) ABSTRACT

An RFD reader includes a transceiver configured to receive a first radio frequency signal reflected off at least one surface to provide baseline signal information and a second radio frequency signal reflected off the at least one surface and an object to provide further signal information. A comparator is configured to compare the baseline signal information and the further signal information to provide a signal comparison. A processor is configured to detect the presence of the object in accordance with the signal comparison. A determination is made whether the object is in motion in accordance with the signal comparison. The determination whether the object is in motion is made in accordance with a continuous fluctuation of the second radio frequency signal. A determination whether the object is no longer in motion is made in accordance with an ending of the continuous fluctuation of the second radio frequency signal.

20 Claims, 2 Drawing Sheets

(56) References Cited

U.S. PATENT DOCUMENTS

| | | |
|---|---|---|
| 2008/0061939 A1 | 3/2008 | Davis et al. |
| 2008/0129485 A1 | 6/2008 | Tuttle |
| 2008/0136634 A1 | 6/2008 | Porte et al. |
| 2008/0198001 A1* | 8/2008 | Sarma et al. ............... 340/539.1 |
| 2008/0318682 A1 | 12/2008 | Rofougaran et al. |
| 2008/0318684 A1 | 12/2008 | Rofougaran |
| 2009/0303004 A1 | 12/2009 | Tuttle |
| 2010/0156651 A1 | 6/2010 | Broer |
| 2010/0277289 A1 | 11/2010 | Brauner et al. |
| 2010/0309017 A1* | 12/2010 | Ramchandran et al. . 340/825.49 |

* cited by examiner

BACKGROUND OBJECT SENSOR

BACKGROUND OF THE INVENTION

1. Field of Invention

The present invention generally relates to the field of RFID communication systems, and more particularly, to a system and method for detecting an object within an RFID communication system.

2. Description of Related Art

In, for example, retail establishments, it is desirable to know whether objects or persons are passing through portals or close to portals being monitored by RFID transceivers. For example, it is desirable to know whether an object or person is present in the region of an entrance or exit of a retail establishment, and whether an object or person is present in the region of any opening or openings between a frontstore and a backstore where inventory is stored. Additionally, it is desirable to know whether an object or person is present in the region of any loading docks, or other types of portals for bringing inventory into or out of the retail establishment. Furthermore, it is desirable to know whether an object or person is in motion toward or away from any of the forgoing regions, even if the object or person is not in the immediate region.

It was known in the prior art to use infrared sources and detectors for monitoring the foregoing regions. Infrared detectors used in this manner could detect the motion of an object or person moving either toward or away from a portal. The infrared detectors could provide a detection signal when the motion was detected. Additionally, it was known to use a detection signal from an infrared detector to activate a radar transmission in order to permit further monitoring of the region. The doppler shifts of the radar transmission could then provide further information on the motion in the vicinity of the portal being monitored. Additionally, it was common to use well known light barrier devices to monitor the vicinity of portals. The light barriers could provide a detection signal when an object or person passing through the portal broke a light beam.

However, the known methods for detecting motion around the RFID transceivers required that a specialized, dedicated device be added to the RFID transceivers. Even the addition of a simple detection device such as an infrared detector or a light barrier added some size and cost to the RFID transceivers. The requirement for additional space for monitoring regions such as the regions around portals is especially problematic in retail applications that have limited and very expensive retail space.

For example, U.S. Pat. No. 7,023,341 B2 issued to Stilp teaches an RFID reader for detecting motion using doppler in a security network. The RFID reader sent and received RF signals, and measured the reflected pulses relative to the transmitted pulses. Many doppler systems like the one taught by Stilp could easily detect a person walking at a normal speed. The system disclosed by Stilp could also alter the power of its doppler transmissions. By varying the transmission power, the detection range of the RFID readers could be varied. The doppler motion detection in Stilp was performed simultaneously with searching for transponders using conventional tag interrogation techniques.

U.S. Patent Pub. No. 2008/0318684 A1 by Rofougaran teaches RF position locating in a video gaming system. The teachings in Rofougaran include sweeping an area with RF signals of several different frequency bands, and determining the physical layout of the environment based on reflected, absorbed and refracted signals, angle of incidence and backscatter of the swept signals. The distance to the player, the other objects in the room, the ceiling, the floor, the walls, etc. were determined from the received signals and stored for use during a game. Monitoring of the movements of the player thereafter during the game depended on the player wearing a gaming object.

U.S. Patent Pub. No. US2008/0001735 A1 by Tran is of general interest for teaching determining when a person passes through a door using a combination of different devices. Tran teaches using radar doppler shift of an RF signal reflected off the person. Tran also teaches using ultrasonic devices and photosensors. The results of the determinations made using the different devices could be combined to distinguish ranges.

U.S. Pat. No. 5,030,941 issued to Lizzi also teaches a number of different auxiliary detectors for detecting motion near or through RFID portals. The use of photoelectric sensors, body heat sensors and floor switches are taught by Lizzi.

However, the use of the auxiliary sensors taught by Lizzi, as well as the other systems set forth above, all require a specialized, dedicated device to be added to the RFID transceivers in order to detect the presence or motion of objects or persons in the vicinity of a RFID transceiver monitoring a portal. This increases the size and costs of the RFID transceiver.

All references cited herein are incorporated herein by reference in their entireties.

BRIEF SUMMARY OF THE INVENTION

An RFID reader includes a transceiver configured to receive a first radio frequency signal reflected off at least one surface to provide baseline signal information and a second radio frequency signal reflected off the at least one surface and an object to provide further signal information. A comparator is configured to compare the baseline signal information and the further signal information to provide a signal comparison. A processor is configured to detect the presence of the object in accordance with the signal comparison. A determination is made whether the object is in motion in accordance with the signal comparison. The determination whether the object is in motion is made in accordance with a continuous fluctuation of the second radio frequency signal. A determination whether the object is no longer in motion is made in accordance with an ending of the continuous fluctuation of the second radio frequency signal.

At least one of the first and second radio frequency signals is a simulated electronic product code signal. The comparator is configured to compare received signal strengths. A received signal strength of the first radio frequency signal includes a first sum of signal strengths of a plurality of component signals received by the RFID receiver. A received signal strength of the second radio frequency signal comprises a second sum of signal strengths equal to the first sum of signal strengths and at least one additional signal strength corresponding to a radio frequency signal reflected off the object.

The comparator is configured to compare a received signal strength of at least one of the first and second radio frequency signals in accordance with a plurality of time samples. The comparator is configured to compare signal phase information. A determination of a signal phase of at least one of the first and second radio frequency signals is made in accordance with a plurality of time samples.

A tag inventory is performed by the RFID reader. The first radio frequency signal includes a signal with a power level of approximately 30 dBm and the second radio frequency signal includes a signal with a power level less than approximately −5 dBm. The signal comparing and the plurality of tag inventories are interleaved.

In another embodiment of the invention, a method for detecting the presence of an object having at least one surface in a monitored region in an RFID communication system includes receiving a first radio frequency signal reflected off the at least one surface to provide baseline signal information. The method also includes receiving a second radio frequency signal reflected off the at least one surface and the object to provide further signal information. The baseline signal information and the further signal information are compared to provide a signal comparison. The presence of the object can be detected in accordance with the signal comparison.

A determination is made whether the object is in motion in accordance with the signal comparison. A determination is made whether the object is in motion in accordance with a continuous fluctuation of the second radio frequency signal. A determination is made whether the object is no longer in motion in accordance with an ending of the continuous fluctuation of the second radio frequency signal.

At least one of the first and second radio frequency signals is a simulated electronic product code signal. The comparing is a comparing of received signal strengths. A radio signal strength of the first radio frequency signal is a first sum of signal strengths of a plurality of component signals received by an RFID receiver. A radio signal strength of the second radio frequency signal is a second sum of signal strengths equal to the first sum of signal strengths and at least one additional signal strength corresponding to a signal reflected off the object. A received signal strength of at least one of the first and second radio frequency signals is determined in accordance with a plurality of time samples. The comparing is a comparing of signal phase information. A signal phase of at least one of the first and second radio frequency signals is determined in accordance with a plurality of time samples.

A tag inventory is performed. The first radio frequency signal can be a signal with a power level of approximately 30 dBm and the second radio frequency signal can be a signal with a power level less than approximately −5 dBm. The detecting is interleaved with a plurality of tag inventories.

The RFID communication system includes a marker tag and the baseline signal information is determined in accordance with the marker tag to provide marker baseline information. The presence of the object is determined in accordance with the marker baseline information. A distance to the object is determined in accordance with the signal comparison. A threshold received signal strength is determined and the distance to the object is determined in accordance with the threshold received signal strength.

In the RF background object sensing system and method of the invention, a simulated Electronic Product Code (EPC) signal can be transmitted by an RFID transceiver in order to assist in detecting an object or a person that is present in the region of the RFID transceiver. Any radio frequency signal whatsoever can be transmitted by the RFID transceiver and reflected off the object in order to detect the presence of the object. However, the electronic product code signal is preferred because the RFID transceiver is well adapted to detect the signal, and can therefore detect simulated electronic product code signals reflected off the object or person very easily.

The RF background object sensing system can collect and store information regarding RF reflections of the transmitted simulated electronic product code signal when it is known that no objects or persons to be monitored are in the region of the RFID transceiver. The reflections of the simulated electronic product code signal under these circumstances can depend on the configuration of the surroundings of the transceiver, such as the walls, the ceilings, the floors, any shelves or support beams, etc. This information can be stored as background signal information, or baseline signal information, for later comparisons.

The simulated electronic product code signal can also be transmitted by the RFID transceiver while the system and method of the invention is monitoring the region of the transceiver for the presence or motion of objects or persons. The simulated electronic product code signal reflects off any object or person moving into the monitored region, thereby providing further signal information. The further signal information regarding the reflections of the transmitted electronic product code signal off the object can be collected while the system of the invention is monitoring the region of the RFID transceiver.

The further signal information is compared with the baseline signal information that was collected and stored when it was known that no object or person to be monitored was present in the region of the transceiver. Fluctuations between the baseline signal information and the signal information read during monitoring for the presence of an object can indicate the presence of an object. Therefore, based on the comparison of the stored baseline signal information and the further signal information by the system detection logic, a determination can be made whether an object has appeared in the vicinity of the transceiver. If the presence of an object is detected according to the comparison, the transceiver can generate a detection signal. Furthermore, the comparison of further signal information with the baseline signal information can be used to determine whether the object is in motion.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
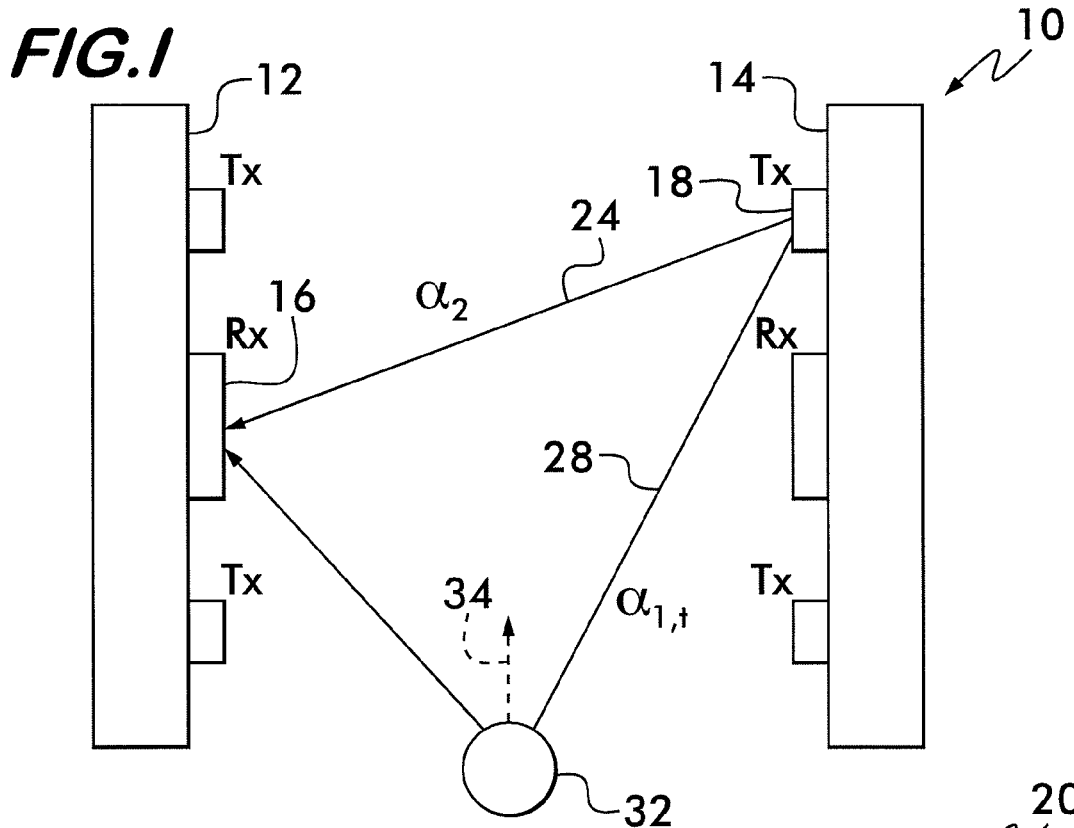
FIG. 1 shows a schematic representation of an embodiment of a background object sensing system and method according to the present invention.

Referring now to FIG. 1, there is shown a schematic representation of an embodiment of the background object sensing system 10 of the present invention, as viewed looking horizontally into a portal. The background object sensing system 10 includes an RFID receiver 16 mounted on a pedestal 12 and an RFID transmitter 18 mounted on a pedestal 14. The RFID transmitter 18 and RFID receiver 16 can be parts of any known RFID transceiver system. Therefore, while the invention is described with respect to pedestal mounted transmitters and receivers for illustrative purposes, it will be understood that the invention can be practiced using overhead transceiver devices or any other types of transceiver devices. When the RFID transmitter 18 transmits a radio frequency signal it can be received by the RFID receiver 16. For example, the radio frequency signal 24 transmitted from the RFID transmitter 18 can follow the direct line of sight path to the RFID receiver 16. The complex attenuation of the radio frequency signal 24 as it travels to the RFID receiver 16 is $\alpha_2$.

The background object sensing system 10 can be located at any area or region where monitoring for the presence of RFID tags is desired. Additionally, it can be located at any area or region where monitoring for the presence or an object of objects or persons is desired, either simultaneously or alternately with the monitoring for RFID tags. For example, it can be placed in the region of the exit or exits of retail establishments, and in the region of the opening or openings between a frontstore and a backstore where the inventory of the retail establishment is stored. It can also be located in the region of any loading docks, or any other types of portals for bringing inventory into or out of the establishment.

It will be understood by those skilled in the art that the radio frequency signals transmitted by the RFID transmitter 18 can reflect off the surfaces of any objects, floors, walls, ceilings, etc. in the monitored region of the background object sensing system 10. Furthermore, the RFID receiver 16 can receive all of the reflected signals from the RFID transmitter 18. Therefore, the RFID receiver 16 can receive multicomponent signals y(t) when the RFID transmitter 18 transmits a signal, wherein each component of y(t) can correspond to one of the surfaces that the transmitted signal bounces off. The multicomponent signal y(t) received by the RFID receiver 16 can be expressed in Eqn. 1 as:

$$y(t) = \Re\left[\sum_{i=1}^{N_t} \alpha_{i,t} s_i(t) e^{j2\pi ft}\right] \quad \text{(Eqn. 1)}$$

in the case where the multicomponent signal y(t) has $N_t$ components. Since there can be different numbers of multipath components over time $N_t$, is a function of time. The complex attenuation factor of Eqn. 1 can be denoted $\alpha_{i,t}$ if it depends on time.

In order to detect an object, the multicomponent signal y(t) of Eqn. 1 can be sampled over a period of time. For example, n samples of the multicomponent signal y(t) can be taken, and the received signal strengths, or the amplitudes, can be determined for each of the n samples. The amplitudes of the n samples of the multicomponent signal y(t) can be expressed for each value of time from $t_1$ to $t_n$ as shown in Eqn. 2:

$$R_A = [|y(t_1)|, |y(t_2)|, |y(t_3)|, \ldots |y(t_n)|] \quad \text{(Eqn. 2)}$$

In addition to determining the signal strength of the samples of the multicomponent signal y(t), it is possible to determine the phase angle information of the received signal y(t) over n samples. The phase samples $\angle y(t_i)$ can be determined for each of the n values of time from time $t=t_1$ to time $t=t_n$ as shown in Eqn. 3:

$$R_P = [\angle y(t_1), \angle y(t_2), \angle y(t_3), \ldots \angle y(t_n)] \quad \text{(Eqn. 3)}$$

Therefore, when no objects or persons to be monitored are in the monitored region of the background object sensing system 10, Eqns. 1-3 can be used to determine background signal information, or baseline signal information, of the background object sensing system 10 for later comparisons. Furthermore, any other parameters that can be measured by the background object sensing system 10, in addition to received signal strength and phase angle, can be determined when no objects or persons to be monitored are in the region for later comparison. Fluctuations between the baseline signal information and further signal information read during monitoring for the presence of an object can indicate the presence of an object.

Additionally, an object 32 can be disposed in the monitored region of the background object sensing system 10. A radio frequency signal 28 can be transmitted from the RFID transmitter 18, reflected off the surface of the object 32, and received by the RFID receiver 16. The reflected radio frequency signal 28 can have a complex attenuation $\alpha_1$. Furthermore, the object 32 in the region of the background object sensing system 10 can move in any direction, including movement in three dimensions. One possible direction of movement for the object 32 is indicated by the dotted arrow 34. If the object 32 is moving, the attenuation of the radio frequency signal 28 is a complex function of time, $\alpha_{1,t}$.

Assuming that no other objects are in the region of the background object sensing system 10 to reflect radio frequency signals from the RFID transmitter 18 to the RFID receiver 16, the multicomponent signal y(t) received by the RFID receiver 16 has two components, given as:

$$y(t) = \Re[\alpha_{1,t} s(t) e^{j2\pi ft} + \alpha_2 s(t) e^{j2\pi ft}]. \quad \text{(Eqn. 4)}$$

In Eqn. 4 the term $\alpha_{i,t} s(t) e^{j2\pi ft}$ represents the component of the multicomponent signal y(t) due to the radio frequency signal 28 reflecting off the surface of the moving object 32, and $\alpha_{1,t}$ changes as a function of time. The term $\alpha_2 s(t) e^{j2\pi ft}$ represents the component of the multicomponent signal y(t) due to the direct line of sight radio frequency signal 24, and $\alpha_2$ does not change as a function of time.

Figure 2:
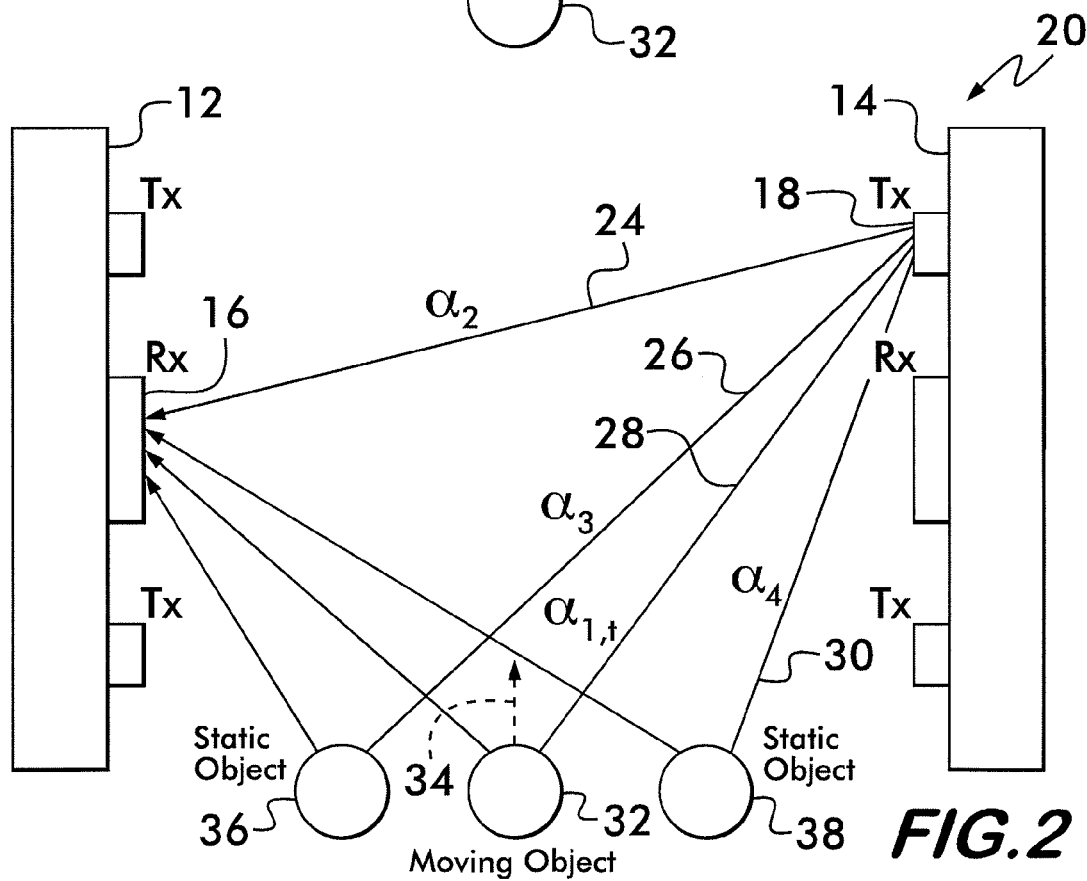
FIG. 2 shows a schematic representation of an alternate embodiment of the background object sensing system and method of FIG. 1.

Referring now to FIG. 2, there is shown a background object sensing system 20. The background object sensing system 20 is an alternate embodiment of the background object sensing system 10. The background object sensing system 20 includes the RFID transmitter 18 and the RFID receiver 16 as previously described with respect to the background object sensing system 10. It also includes the line of sight radio frequency signal 24 and the reflected radio frequency signal 28, which reflects off the moving object 32, as previously described.

However, in the background object sensing system 20 the RFID transmitter 18 also transmits reflected radio frequency signals 26, 30. The radio frequency signal 26 reflects off a static object 36, and is received by the RFID receiver 16. The attenuation of the radio frequency signal 26 is $\alpha_3$. The radio frequency signal 30 reflects off a static object 38, and is received by the RFID receiver 16. The attenuation of the radio frequency signal 30 is $\alpha_4$. Since the objects 36, 38 which reflect the radio frequency signals 26, 30 are static, the attenuations $\alpha_3$ and $\alpha_4$, respectively, are not functions of time.

Under these circumstances, the multicomponent signal y(t) received by the RFID receiver 16 can be expressed in Eqn. 5 as:

$$y(t) = \Re\left[\alpha_{1,t} s_i(t) e^{j2\pi ft} + \sum_{i=2}^{4} \alpha_i s_i(t) e^{j2\pi ft}\right] \quad \text{(Eqn. 5)}$$

where the term $\alpha_{1,t} s_i(t) e^{j2\pi ft}$ represents the component of the multicomponent signal y(t) due to the radio frequency signal 28 reflecting off the moving object 32, and the term $\alpha_i s_i(t) e^{j2\pi ft}$ represents the static components due to the radio frequency signals 24, 28, 30, as i=2 to 4.

The radio frequency signals generated by the RED transmitter 18 and used for monitoring an area for an object 32 can be transmitted at a very low energy level. Any type of transmitted signal can be used. However, RFID readers are usually designed to decode electronic product code signals, and commonly available RFID readers are well adapted to decode the electronic product code signals. Therefore, the use of simulated electronic product code signals is preferred when performing the method of the invention because no redesign of the RFID readers is required when electronic product code signals are used.

In one preferred embodiment of the invention, the radio frequency signals used can be less than approximately −5 dBm. Furthermore, they can be transmitted approximately ten times per second, where each transmission can take approximately two milliseconds. Therefore, the duty cycle of the signals can be less than two percent. This is very advantageous because the use of such low transmit power levels minimizes the amount of interference with any other RFID devices that may be nearby.

In one preferred embodiment, the background object sensing system 20 can detect whether the object 32 is relatively farther away from the portal being monitored, or relatively closer to or within the portal being monitored. In order to determine the distance to the object 32, different detection thresholds can be provided for the detection logic of the system 20. The background object sensing system 20 can use a relatively lower detection threshold in order to permit the triggering of an object detection event based on small variations in received radio frequency energy levels. This can permit the detection of an object 32 outside of, or a distance away from, the portal being monitored, depending on how low the detection threshold is set. This type of detection can replace many of the currently available doppler radar sensors. Furthermore, the detection threshold, as well as the energy level of the transmission, can be varied up and down in order to vary the range of detection and localize the object 32 with more accuracy.

Additionally, the background object sensing system 20 can also use a relatively higher detection threshold, in order to permit the triggering of an object detection event based on relatively larger variations in received radio frequency energy levels. This can permit the detection of an object 32 closer to or inside the portal being monitored, depending on how high the threshold is set. This type of detection can replace many of the currently available light barriers. It will be understood that the relatively lower and relatively higher detection thresholds can be set for any parameters that can be measured by the background object sensing system 20, including the received signal strength and the phase angle.

In another preferred embodiment, the background object sensing system 20 can have two modes of operations. The two modes can include the object sensing mode of the invention, in which an object within a monitored region can be detected, and an RFID tag inventory mode. In the RFID tag inventory mode the RFID transmitter 18 transmits a request for RFID tag identifications. The RFID tags within range of the transmission respond by backscattering their electronic product code. The RFID receiver 16 receives the backscattered electronic product code responses, and thereby determines the population of RFID tags within the range of the RFID transmitter 18 and the RFID receiver 16. A typical power level for transmission of the radio frequency signals in the RFID tag inventory mode can be, for example, 30 dBm.

When the background object sensing system 20 is not in the RFID tag inventory mode it can enter the object sensing mode. In the object sensing mode, the background object sensing system 20 can reduce the RF power level from a typical value of 30 dBm for the inventory mode, to a much lower value, for example a value in the vicinity of −5 dBm. If the background object sensing system 20 is a multichannel system, the simulated electronic product code can be transmitted and received at the low power level by any one of the transmitter and receiver channels. When an object 32 is detected or another tag inventory is scheduled, the reader can return to the RFID tag inventory mode and perform another inventory round.

Furthermore, in another preferred embodiment of the invention, the background object sensing system 20 can perform both object sensing and inventory rounds, continuously. One way to accomplish this is to interleave the low power simulated electronic product code object sensing rounds with the normal inventory rounds. For example, one round of normal inventory at approximately 30 dBm can be followed by one round of low power object sensing using a simulated electronic product code at approximately −5 dBm. The round of low power object sensing can then be followed by a round of inventory, etc. This can result in a small drop in the throughput of the inventory operations, since a portion of the time of the system 20 is taken for the object sensing operations rather than for tag inventory. In a typical situation the drop in inventory throughput may be on the order of approximately 0.6% when background object sensing is performed.

Another way to perform both object sensing and inventory rounds continuously is to place an extra tag, a marker tag, on a surface in the region to be monitored for the presence of an object 32. For example, the marker tag can be placed in the vicinity of the exit or exits of retail establishments, in the vicinity of the opening or openings between a frontstore and a backstore, or in the vicinity of any loading docks or other types of portals for bringing inventory into or out of the establishment. The baseline signal information of the marker tag can be determined by reflecting simulated electronic product code signals or other signals off the marker tag and any other static surfaces around the marker tag, when it is known that no objects 32 to be monitored are in the vicinity of the marker tag, as previously described. The marker baseline signal information obtained in this manner can be saved for later comparisons.

During normal inventory rounds, the response of the marker tag can be read in the same manner as any of the tags being inventoried. The readings of the response from the marker tag can be compared with the baseline signal information of the marker tag. Fluctuations between the baseline signal information of the marker tag and further signal information read from the marker during monitoring can indicate the presence of an object 32. Because there is one additional tag to be read, beyond the tags being inventoried, there may be a small drop in throughput of the inventorying process using this method for detecting the presence of an object 32 in the region of the marker tag. The drop can be approximately the same as described above.

Figure 3:
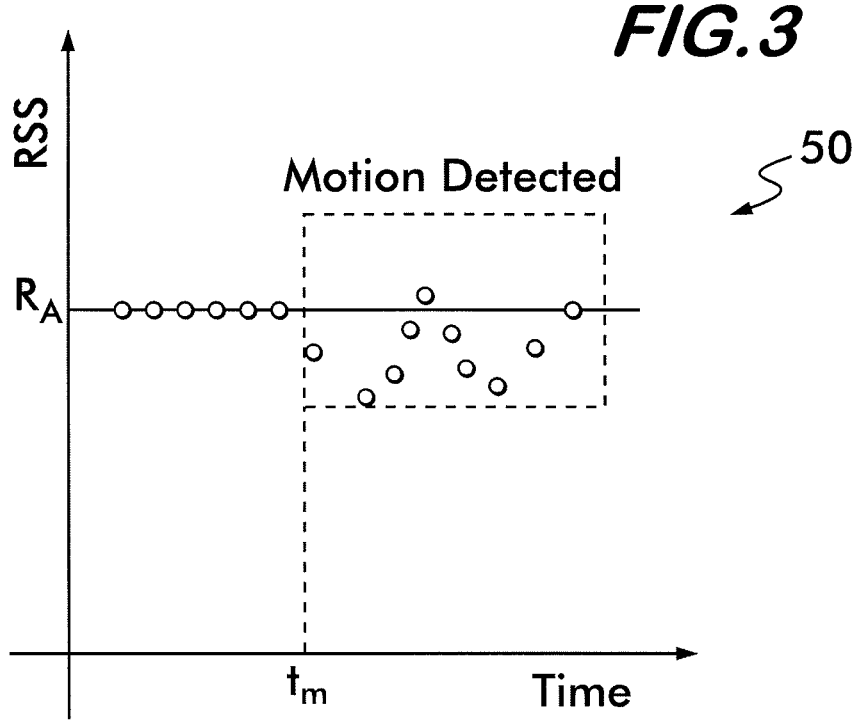
FIG. 3 shows a graphical representation of received signal strengths within the system and method of FIG. 1.

Referring now to FIG. 3, there is shown a graphical representation 50. The graphical representation 50 shows the received signal strength of the multicomponent signal y(t) received by the RFID receiver 16 within the background object sensing systems 10, 20, as a function of time. The radio signal strength of a signal transmitted by the RFID transmitter 18 can be calculated, for example, by Eqn. 2 above. This signal can represent the sum of signals reflected off any number of stationary objects such as walls, floors, ceilings, shelves, etc. From time t=0 until time $t=t_m$ there are no objects 32 to be monitored in the region of the RFID receiver 16. Therefore, the values of the received signal strength from time t=0 to time $t=t_m$ remain constant at the steady state value $R_A$. Therefore, the value $R_A$ can represent the baseline signal information of the monitored region of the RFID receiver 16.

At time $t=t_m$, an object such as the object 32 is present in the region of the RFID receiver 16. This is indicated by the value of the received signal strength fluctuating from $R_A$ beginning at time $t=t_m$. The simulated electronic product code signal transmitted by the RFID transmitter 18 reflects off the object 32, and follows a path to the RFID receiver 16, such as the path followed by the radio frequency signal 28 in FIG. 1. Therefore, the value of received signal strength received by the RFID receiver 16 fluctuates from $R_A$ when the object 32 is in the region of the background object sensing system 20.

Thus, the object 32 in the region of the RFID transmitter 18 can be detected by the background object sensing system 20 according to the monitored value of the received signal strength. Specifically, the presence of the object 32 can be detected when the value of the received signal strength varies from the steady state value $R_A$. A detection signal indicating a detection event can be generated by the background object sensing system 20 in response to the variation in the received signal strength.

Furthermore, the background object sensing system 20 can distinguish between a case in which an object 32 continues moving after entering the region of the receiver 16, and a case in which the object 32 stops moving after entering the region. If the object 32 detected by the background object sensing system 20 continues to move after entering the monitored region, the received signal strength can continue fluctuating, as shown by the continuous fluctuation in the graphical representation 50 in the period after time $t=t_m$. The continuous fluctuation of the received signal strength can last as long as the object 32 continues moving through the region. If the object 32 stops moving after entering the region and remains stationary in the region, the received signal strength can reach a new steady state value, different from $R_A$. Additionally, if the object 32 continues to move until it leaves the monitored region, the value of the received signal strength can return to the steady state value $R_A$.

Figure 4:
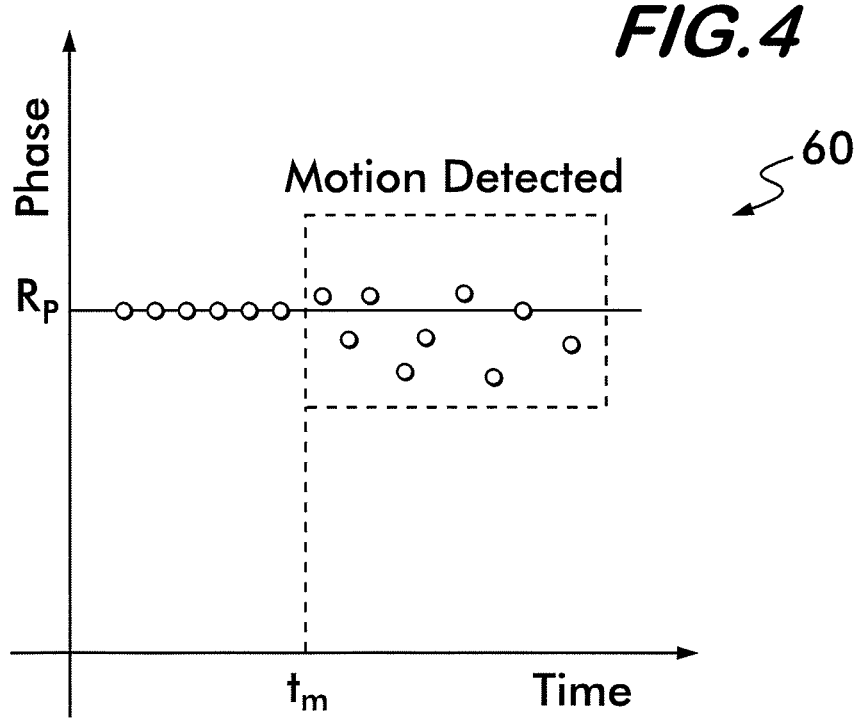
FIG. 4 shows a graphical representation of received phase shift information within the system and method of FIG. 1.

Referring now to FIG. 4, there is shown a graphical representation 60. The graphical representation 60 shows the phase shift information of the multicomponent signal y(t) received by the RFID receiver 16 within the background object sensing systems 10, 20, as a function of time. The phase shift information of a signal transmitted by the RFID transmitter 18 can be calculated, for example, by Eqn. 3 above. This signal can represent the sum of signals reflected off any number of stationary objects such as walls, floors, ceilings, shelves, etc. From time t=0 until time $t=t_m$ there are no objects 32 to be monitored in the region of the RFID receiver 16. Therefore, the values of the phase shift information from time t=0 to time $t=t_m$ remain constant at the steady state value $R_P$. Therefore, the value $R_P$ represents the baseline phase shift information of the region of the RFID receiver 16.

At time $t=t_m$, an object such as the object 32 is present in the region of the RFID receiver 16. This is indicated by the value of the phase shift information fluctuating from $R_P$ beginning at time $t=t_m$. The value of phase shift information fluctuates from $R_P$ when the object 32 is in the region of the RFID receiver 16. It fluctuates because the electronic product code signal transmitted by the RFID transmitter 18 reflects off the object 32, and follows a path to the RFID receiver 16, such as the path followed by the radio frequency signal 28 in FIG. 1.

Thus, the object 32 in the region of the RFID transmitter 18 can be detected by the background object sensing system 20 according to the monitored values of the phase shift information. Specifically, the presence of the object 32 can be detected when the value of the phase shift information varies from the steady state value $R_P$. A detection signal indicating a detection event can be generated by the background object sensing system 20 in response to the variation in the phase shift information.

Furthermore, using the phase shift information the background object sensing system 20 can distinguish between a case in which an object 32 continues moving after entering the region of the receiver 16, and a case in which the object 32 stops moving after entering the region. If the object 32 detected by the background object sensing system 20 continues to move after entering the region, the phase shift information can continue fluctuating, as shown by the continuous fluctuation in the graphical representation 60 in the period after time $t=t_m$. The continuous fluctuation of the phase shift information can last as long as the object 32 continues moving. If the object 32 stops moving after entering the region and remains stationary in the region, the phase shift information can reach a new steady state value, different from $R_P$. Additionally, if the object 32 continues to move until it leaves the monitored region, the value of the phase shift information can return to the steady state value $R_P$.

In another embodiment, the RFID receiver 16 can detect and identify individual tags according to the received electronic product code signals of the tags, for example during an inventory round, as known in the art. Additionally, the RFID reader 16 can repeatedly detect and identify the same individual tags, for example during subsequent inventory rounds. Furthermore, the received signal strength and/or phase information associated with each tag can be determined according to Eqns. 2 & 3, above, and stored each time it is detected. Therefore, for each individual identified tag the stored information can be analyzed in order to determine whether it changes over time.

If the stored readings of signal strength and/or phase information of an individual tag change over time, a determination can be made that the tag is moving. If the information does not change over time a determination can be made that the tag is not moving. If a tag is determined to be moving in this manner, the RFID reader 16 can continue to interrogate the tag and monitor the received signal strength and/or phase information from the tag in order to monitor its movement. The interrogation can continue until the tag is no longer detected or until the movement of the tag stops.

The operations of the background object sensing systems 10, 20 may be implemented in the form of a processing system, or in the form of software executed in a computer processor system. The computer processor system may be located within the RFID reader 16. Furthermore, the processor system may be implemented by any type of computer system. The processor system may be equipped with a display or monitor, a microprocessor, memories and/or internal or external communications devices (e.g., modem, network cards, etc.) and optional input devices (e.g., a keyboard, mouse or other input device) and wireless devices. Computer program instructions for causing the processor system to implement the operations of the background object sensing systems 10, 20 may be stored on any recordable medium, e.g., RAM, ROM, magnetic, optical, floppy, DVD, CD, etc.

The computer program instructions may be stored in a computer readable medium that can direct a computer, other programmable data processing apparatus, or other devices to function in a particular manner. The instructions stored in the computer readable medium can configure the processor to control RFID reader transmit and receive functions, to perform calculations on electronic signals representing radio frequency waves, such as calculations to determine received signal strength and phase information.

Furthermore, the instructions can configure the processor to perform comparator operations for comparing any parameters within the RFID reader 16, such as received signal strength and phase information, and to detect an object in the vicinity of the reader 16 based on the comparison. The computer program instructions may also be loaded onto a computer, other programmable data processing apparatus, or other devices to cause a series of operation steps to be performed on the computer, other programmable apparatus or other devices to produce a computer implemented process.

A processing system suitable for storing and/or executing program code to perform the foregoing operations may be implemented by any conventional or other computer or processing systems. The computer or processing systems may be equipped with a display or monitor and a base, e.g., including the processor, memories and/or internal or external communications. The systems can also include at least one processor coupled directly or indirectly to memory elements through a system bus. The memory elements can include local memory employed during actual execution of the program code, bulk storage, cache memories and any other kind of memories known to those skilled in the art.

While the invention has been described in detail and with reference to specific embodiments thereof, it will be apparent to one skilled in the art that various changes and modifications can be made therein without departing from the spirit and scope thereof.

What is claimed is:

1. A system, comprising:
   an RFID transmitter positioned about one side of a portal, wherein the RFID transmitter is configured to transmit a first radio frequency signal and a second radio frequency signal in a monitored region;
   an RFID receiver positioned about another side of the portal, wherein the RFID receiver is configured to receive the first radio frequency signal and the second radio frequency signal, the first radio frequency signal reflecting off of a surface of an object to be monitored and the second radio frequency signal not reflecting off of the surface of the object to be monitored;
   a comparator configured to compare the first radio frequency signal with the second radio frequency signal to provide a signal comparison; and
   a processor configured to determine, based on the signal comparison, whether the object to be monitored has been positioned in the monitored region.

2. The system of claim 1, wherein the processor is further configured to determine whether the object to be monitored is in motion in accordance with the signal comparison.

3. The system of claim 2, wherein the processor is further configured to determine whether the object to be monitored is in motion in accordance with a continuous fluctuation of the second radio frequency signal.

4. The system of claim 3, wherein the processor is further configured to determine whether the object to be monitored is no longer in motion in accordance with an ending of the continuous fluctuation of the second radio frequency signal.

5. The system of claim 1, wherein at least one of the first and second radio frequency signals is a simulated electronic product code signal.

6. The system of claim 1, wherein the comparator is further configured to compare received signal strengths.

7. The system of claim 6, wherein a received signal strength of the first radio frequency signal comprises a first sum of signal strengths of a plurality of component signals received by the RFID receiver.

8. The system of claim 7, wherein a received signal strength of the second radio frequency signal comprises a second sum of signal strengths equal to the first sum of signal strengths and at least one additional signal strength corresponding to a radio frequency signal reflected off the object to be monitored.

9. The system of claim 6, wherein the comparator is further configured to compare a received signal strength of at least one of the first and second radio frequency signals in accordance with a plurality of time samples.

10. The system of claim 1, wherein the comparator is further configured to compare signal phase information.

11. The system of claim 10, wherein the processor is further configured to determine a signal phase of at least one of the first and second radio frequency signals in accordance with a plurality of time samples.

12. The system of claim 1, further comprising a tag inventory performed by the RFID reader.

13. The system of claim 12, wherein the first radio frequency signal comprises a signal with a power level of approximately 30 dBm and the second radio frequency signal comprises a signal with a power level less than approximately −5 dBm.

14. The system of claim 12, further comprising an interleaving of the comparing and a plurality of tag inventories.

15. The system of claim 1, wherein the processor is further configured to determine a distance to the object to be monitored in accordance with the signal comparison.

16. The system of claim 15, wherein the processor is further configured to determine a threshold received signal strength and the distance to the object to be monitored in accordance with the threshold received signal strength.

17. A method, comprising:
   positioning an RFID transmitter about one side of a portal;
   transmitting, via the RFID transmitter, a first radio frequency signal and a second radio frequency signal in a monitoring region;
   positioning an RFID receiver about another side of the portal;
   receiving, via the RFID receiver, the first radio frequency signal and the second radio frequency signal, the first radio frequency signal reflecting off of a surface of an object to be monitored and the second radio frequency signal not reflecting off of the surface of the object to be monitored;
   comparing the first radio frequency signal with the second radio frequency signal to provide a signal comparison; and
   determining, based on the signal comparison, whether the object to be monitored has been positioned in the monitored region.

18. The method of claim 17, further comprising determining whether the object to be monitored is in motion in accordance with the signal comparison.

19. A system, comprising:
   an RFID transmitter positioned about one side of a portal, wherein the RFID transmitter is configured to transmit a first radio frequency signal and a second radio frequency signal in the monitored region;
   an RFID receiver positioned about another side of the portal, wherein the RFID receiver is configured to receive the first radio frequency signal and the second radio frequency signal, the first radio frequency signal reflecting off of a surface of the object to be monitored and the second radio frequency signal not reflecting off of the surface of the object to be monitored; and
   a processor configured to determine, based on a signal comparison of the first radio frequency signal and the second frequency signal, whether the object to be monitored is positioned in the monitored region.

20. The system of claim 19, wherein the processor is further configured to determine whether the object to be monitored is in motion in accordance with the signal comparison.

* * * * *